United States Patent [19]
Soda et al.

[11] Patent Number: 5,689,225
[45] Date of Patent: Nov. 18, 1997

[54] METHOD FOR DRIVING MAGNETO-RESISTIVE ELEMENT

[75] Inventors: Yutaka Soda, Kanagawa; Munekatsu Fukuyama, Miyagi; Jin Sato, Miyagi; Kiyoshi Ota, Miyagi, all of Japan

[73] Assignee: Sony Corporation, Tokyo, Japan

[21] Appl. No.: 607,563

[22] Filed: Feb. 27, 1996

[30] Foreign Application Priority Data

Feb. 28, 1995 [JP] Japan ................. 7-040966

[51] Int. Cl.$^6$ ................................ H01F 7/08
[52] U.S. Cl. ................................ 335/228
[58] Field of Search ............... 335/228; 360/113, 360/122, 123, 119, 125, 126, 121

[56] References Cited

U.S. PATENT DOCUMENTS

| | | | |
|---|---|---|---|
| 4,443,826 | 4/1984 | Sawada et al. | 360/113 |
| 4,679,107 | 7/1987 | Imakoshi et al. | 360/113 |
| 5,461,527 | 10/1995 | Akiyama et al. | 360/113 |
| 5,493,466 | 2/1996 | Suyama | 360/113 |
| 5,535,077 | 7/1996 | Saito et al. | 360/113 |

*Primary Examiner*—Lincoln Donovan
*Attorney, Agent, or Firm*—Hill, Steadman & Simpson

[57] ABSTRACT

A method for driving a magneto-resistive effect element in which a bias magnetic field is applied by a bias conductor fed with a bias current to a magneto-resistive effect element whose resistivity is changed with an impressed magnetic field, wherein the improvement comprises supplying to said bias conductor a pulsed initial current having a pulse crest value higher than the bias current value prior to supplying said bias current. The MR head can be operated with MR characteristics with stable output and with highly sensitive MR characteristics.

4 Claims, 4 Drawing Sheets

METHOD FOR DRIVING MAGNETO-RESISTIVE ELEMENT

BACKGROUND OF THE INVENTION

This invention relates to a method for driving a magneto-resistive element configured for supplying the bias current to a bias conductor. More particularly, it relates to a method for driving a magneto-resistive effect element for a magneto-resistive effect magnetic head having a magneto-resistive effect head and a bias conductor.

With the recent tendency towards a small size and a large capacity of a hard disc unit, there is an increasing demand for a small-sized hard disc unit with a size on the order of, for example, 2.5", for usage with possible application to a portable computer typified in particular by a note-book type personal computer.

With such small-sized hard disc, since the velocity of the medium is retarded depending upon the disc diameter, the playback output is lowered with a conventional induction type magnetic head, the output of which depends upon the disc velocity, thus frustrating the attempts in increasing the capacity.

Conversely, a magneto-resistive effect magnetic head (MR head), detecting resistance changes in a magnetic layer exhibiting magneto-resistive effect of being changed in resistivity by a magnetic field, has a feature that its playback output is not dependent upon the velocity of the recording medium and a high playback output may be achieved for a lower velocity of the recording medium. Thus the MR head is attracting attention as a magnetic head capable of realizing a large recording capacity with a small-sized hard disc.

The MR head is a playback magnetic head exploiting the so-called magneto-resistive effect phenomenon in which the electrical resistance value is changed with the angle between the direction of magnetization proper to a transition metal and the direction of the current flowing therein. That is, if the stray magnetic flux from the magnetic recording medium is received by the MR element, the direction of magnetization of the MR element is rotated under the effect of the magnetic flux such that the direction of magnetization of the MR head has an angle corresponding to the amount of magnetism with respect to the direction of the current flowing in the MR element. Thus the electrical resistance of the MR element is changed and a change in voltage corresponding to the change in the electrical resistance appears across both electrodes of the MR element through which flows the electrical current. Consequently, the magnetic recording signal can be read out using this voltage change as a voltage signal.

The MR head is formed by forming an MR element, an electrode film or an insulating layer on a substrate by a thin film forming technique and etching the film to a pre-set shape by a photolithographic technique. A lower magnetic pole and an upper magnetic pole are provided in order to provide a shielding structure for delimiting a gap size during reproduction for prohibiting unneeded magnetic flux from flowing into the MR element.

Specifically, in a so-called vertical MR head in which the sense current flows in a direction perpendicular to the track width direction, an insulating layer, a soft magnetic layer operating as the lower magnetic layer and a second insulating layer of $Al_2$ or $SiO_2$ are formed in this order on a non-magnetic substrate. On this insulating layer is formed an MR element for extending in a direction perpendicular to a facing surface with respect to the magnetic recording medium, that is a head surface on which slides a magnetic recording medium, with an end face of the MR element being exposed to the head surface on which slides a magnetic recording medium. On both ends of the MR element are formed a forward end electrode and a rear end electrode for supplying the MR element with the sense current. On the MR device is formed an insulating layer composed of $Al_2O_3$ or $SiO_2$. This insulating layer is sandwiched between the forward end electrode and the rear end electrode. On the insulating layer is formed a bias conductor facing the MR element. On this bias conductor is formed a further insulating layer on which a soft magnetic film operating as the upper magnetic pole is layered to complete the MR head.

The function of the MR element in the MR head is explained. The electrical resistance of the MR element is varied depending upon the intensity (volume) of the magnetic flux entering the MR element. That is, the external magnetic field dependency of the electrical resistance R of the MR device is represented as MR characteristics by an MR curve shown in FIG. 6.

For driving the MR device, the bias current is caused to flow through a bias conductor for previously applying a bias magnetic field Hb to the MR element up to a point where superior linear characteristics are displayed with respect to the external magnetic field and the electrical resistance R is changed most acutely. This point is an operating point A. If a signal magnetic field ΔHs is applied from the magnetic recording medium, it is converted into resistance changes ΔRs. That is, if a preset current Is is allowed to flow in the MR element, this resistance change ΔRs may be taken out as an output voltage ΔVs based upon the Ohm's law. By supplying the sense current Is to the MR element, the MR element is converted into a sole magnetic domain, thus suppressing generation of the so-called Barkhausen jump.

Since the MR element of the MR head is sandwiched by the upper magnetic pole and the lower magnetic pole, the S/N ratio and the recording density of the playback output may be improved as compared to the head devoid of the upper and lower magnetic poles.

The MR head is usually employed as a recording magnetic head, for example, as a compound thin film magnetic head unified with, for example, an inductive type thin film magnetic head. This compound thin-film magnetic head is used for recording/reproducing information signals on or from a magnetic recording medium.

Recently, an increasing demand is raised for improving the recording density for a hard disc. In keeping up therewith, the tendency is towards reducing the track width and reducing the length along the easy axis of the MR element, that is the length perpendicular to the longitudinal axis of the MR element. In such case, hysteretic changes tend to be produced in MR characteristics of the MR element. That is, if a larger external magnetic field, such as stray magnetic field from the recording magnetic field, is applied to the MR element, the MR characteristic curve undergoes transition, such that an output of the MR head becomes unstable.

FIG. 7 shows changes in a track average amplitude (TAA) on repeated recording and reproduction with the use of the above-described compound thin-film magnetic head. The track average amplitude means an average output over a turn of a hard disc.

It is seen from FIG. 7 that, if the recording/reproduction is repeated, the TAA, which is at a lower constant value at the outset, is discontinuously increased as a certain number of times of repetition, indicated at tc in FIG. 7, is reached, after which the TAA is again maintained at a slightly increased larger constant value. This indicates that a change in MR characteristics comparable to a hysteresis is produced at tc.

Thus it is extremely difficult to reduce the size of the MR head as well as to prevent an output from becoming unstable due to reduction in width of the MR element. Consequently, an effective method for possibly overcoming this inconvenience is being searched.

SUMMARY OF THE INVENTION

It is therefore an object of the present invention to provide a method for driving a magneto-resistive effect element capable of significantly improving output stability of the MR element and developing a high output.

According to the present invention, there is provided a method for driving a magneto-resistive effect element in which a bias magnetic field is applied by a bias conductor fed with a bias current to a magneto-resistive effect element whose resistivity is changed with an impressed magnetic field. The method includes supplying to the bias conductor a pulsed initial current having a pulse crest value higher than the bias current value prior to supplying said bias current. The pulse crest value means the maximum value of respective pulses of the initial pulsed current.

Specifically, the pulse width value of the initial current is not less than thrice the bias current value and the pulse width value is not less than 1 msec. If the pulse crest value is less than thrice the bias current value or the pulse width value is less than 1 msec, there may be occasions wherein stable MR characteristics cannot be produced.

According to the present invention, the device having the MR element and a bias conductor supplied with the bias current is mainly a magneto-resistive effect type magnetic head (MR head). It is preferred with the MR head that the MR element be connected in series with the bias conductor. Since the sense current is used simultaneously as the bias current, the initial current is supplied to the bias conductor (MR element) before supplying the sense current to the bias conductor.

Meanwhile, the MR element 1 shows hysteretic changes in its MR characteristics, as shown in FIG. 3. If, in reproducing information signals using the MR element 1, a larger external magnetic field, such as a stray magnetic field from the recording magnetic head, is impressed on the MR element 1, transition occurs on the MR characteristic curve from an operating curve, referred to as a curve S1 in FIG. 3, to the opposite operating curve, referred to herein as a curve S2 in FIG. 3. Since the curve B is steeper than the curve A in the vicinity of the operating point A the MR element 1 exhibits an operation of higher sensitivity when operating on the curve B than when operating on the curve A. Since this change occurs irrevocably, the MR element 1 exhibits MR characteristics of the curve S2 since the time when such change has occurred.

Thus, if the pulses initial current is positively supplied to the MR element 1 prior to supplying the sense current, the MR element 1 shifts to the MR characteristics of the curve S2. If the bias current is continued to be supplied to the bias conductor 14 since that time, the MR element 1 perpetually operates with a stabilized output and excellent sensitivity.

DETAILED DESCRIPTION OF THE PREFERRED EMBODIMENT

Figure 1:
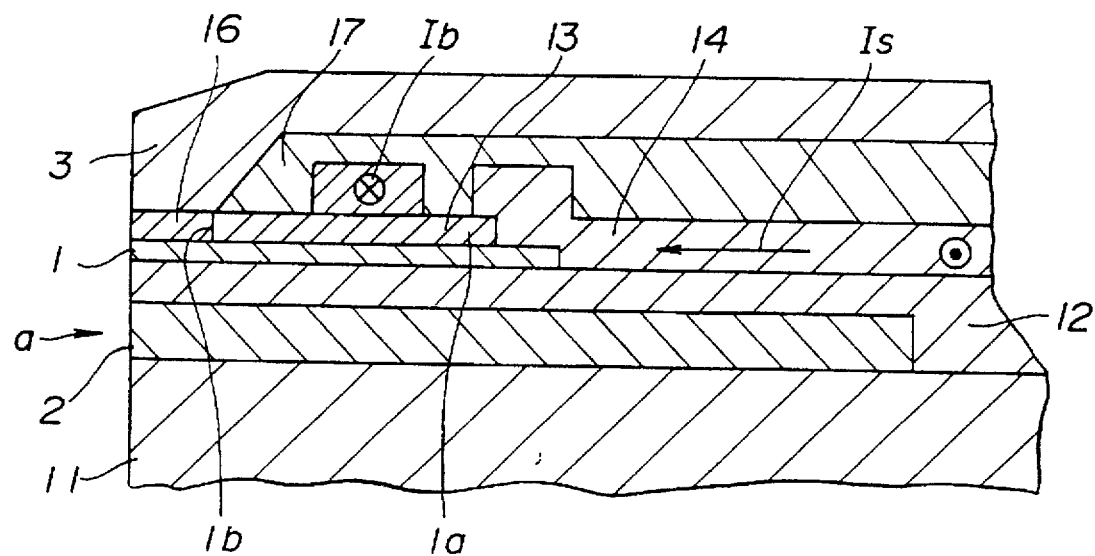
FIG. 1 is a schematic cross-sectional view showing an MR head according to an embodiment of the present invention.

Referring to the drawings, an illustrative embodiment of an MR head of the present invention will be explained in detail.

FIG. 1 shows an MR head of the present embodiment as a so-called vertical type magnetic head having an MR element 1 sandwiched between a lower magnetic pole 2 and an upper magnetic pole 3. The MR element 1 has its difficult axis (longitudinal direction) extending at right angles to a surface a thereof along which slides a magnetic recording medium, herein not shown.

The MR head has its easy axis extending parallel to the surface a along which slides the magnetic recording medium. The easy axis is the direction along which the magnetic anisotropic energy becomes locally maximum and spontaneous magnetization tends to be stabilized, while the difficult axis is the direction along which the magnetic anisotropic energy becomes locally maximum.

Recently, a demand is raised for further increase in capacity of a hard disc device, and attempts have been made in reducing the track width and raising the recording density of the magnetic recording medium. However, if the track width is reduced, an output is lowered, while coercivity is increased and the residual magnetic flux density is lowered, thus leading to deterioration in the S/N ratio. Thus there is proposed a small-sized MR head having an MR element with a high current density and a thin film thickness.

The MR head of the instant embodiment is an example of such magnetic head and has only four terminals, with a bias conductor being used simultaneously, as a rear end electrode as will be explained subsequently.

Specifically, the lower magnetic pole 2 of, for example, Ni—Fe, as a shield magnetic film, is formed on a non-magnetic substrate 11 of, for example, $Al_2O_3$—TiC. On the surface of this lower magnetic pole 2 is layered an insulating layer 12 of, for example, silicon dioxide ($SiO_2$). On the insulating layer 12 is formed the MR element 1, on which is layered a further insulating layer 13 of, for example, $SiO_2$, excepting a forward end portion 1b and a rear end portion 1a of the MR element 1.

A bias conductor 14 of an electrically conductive material is electrically connected in series with the rear end 1a of the MR element 1 and is partially overlaid on the insulating layer 13. A forward end electrode 16 of an electrically conductive material is formed in continuation to the forward end portion 1b of the MR element 1 on its opposite end.

Figure 2:
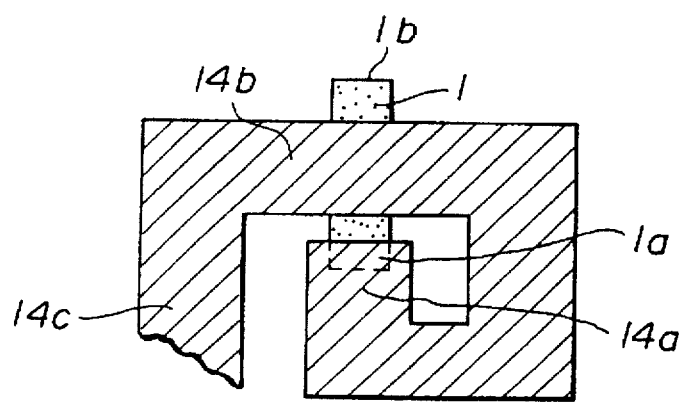
FIG. 2 is a schematic plan view showing an MR element and a bias conductor making up an MR head shown in FIG. 1.

The bias conductor 14 is substantially helical in plan configuration, as shown in FIG. 2. That is, the bias conductor 14 has its end 14a electrically connected in series with the rear end portion 1a of the MR element 1, and is bent at a right angle thrice to form a bias magnetic field impressing portion 14b which crosses the difficult axis of the MR element 1 on the insulating layer 13. The bias conductor is further bent once at a right angle to form a sense current supplying portion 14c on its opposite end.

If the sense current of a pre-set intensity is allowed to flow in the bias conductor 14, it is supplied as a bias current to the bias magnetic field impressing portion 14b for impressing a bias magnetic field to the MR element 1. At the same time, the sense current is fed via the rear end portion 1a to the MR element 1.

An insulating layer 17 of, for example, $SiO_2$, is formed on the bias conductor 14 and the insulating layer 13, and the upper magnetic pole 3, comprised of a magnetic film of, for example, Ni—Fe, is formed thereon to complete the MR head.

In the above-described MR head, the MR element 1 is arrayed so that its longitudinal direction is at right angles to its surface facing the magnetic recording medium, that is the surface a along which slides the magnetic recording medium, with an end face of the MR element 1 being exposed to the surface a along which slides the magnetic recording medium. The forward end electrode 16 and the bias electrode 14 are arranged on the forward end portion 1b of the MR element 1 reaching the surface a along which slides the magnetic recording medium, and on the rear end portion 1a of the MR element 1 spaced a pre-set distance from the forward end portion 1b, respectively, with a region of the MR element 1 confined between the forward end electrode 16 and the end 14a of the bias conductor 14 exhibiting the magneto-resistive effect.

When the sense current (bias current) is supplied from the sense current supplying portion 14c of the bias conductor 14 to the MR element 1 in the above-described MR head, a pulsed initial current, having a pulse crest value larger in intensity than the sense current, is supplied to the MR element 1 prior to supplying the sense current to the MR element. The pulse crest value means the maximum pulse current intensity of the pulsed initial current.

Specifically, the pulse crest value is preferably not less than thrice the sense current intensity and the pulse width is preferably not less than 1 ms. If the pulse crest value is less than thrice the sense current value or the pulse width value is less than 1 ms, it becomes occasionally difficult to realize stable MR characteristics.

Figure 3:
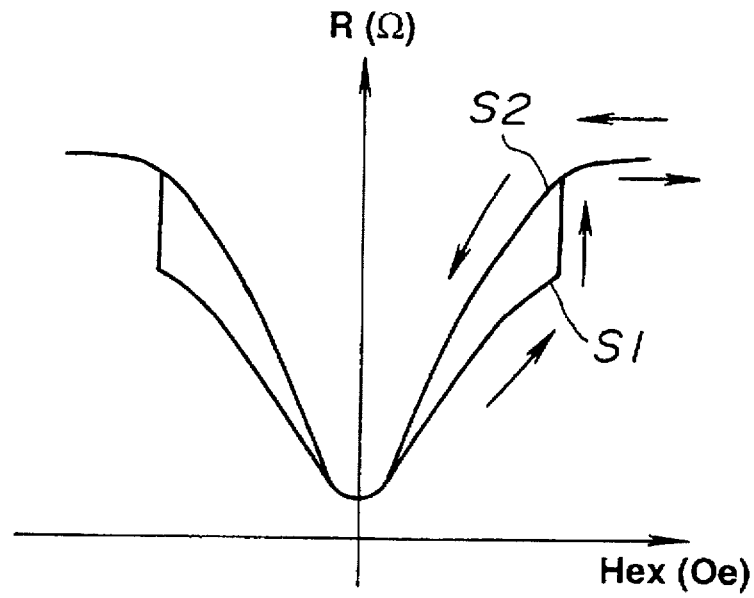
FIG. 3 is a graph showing the manner of hysteretic changes in MR characteristics of the MR element.
Figure 4:
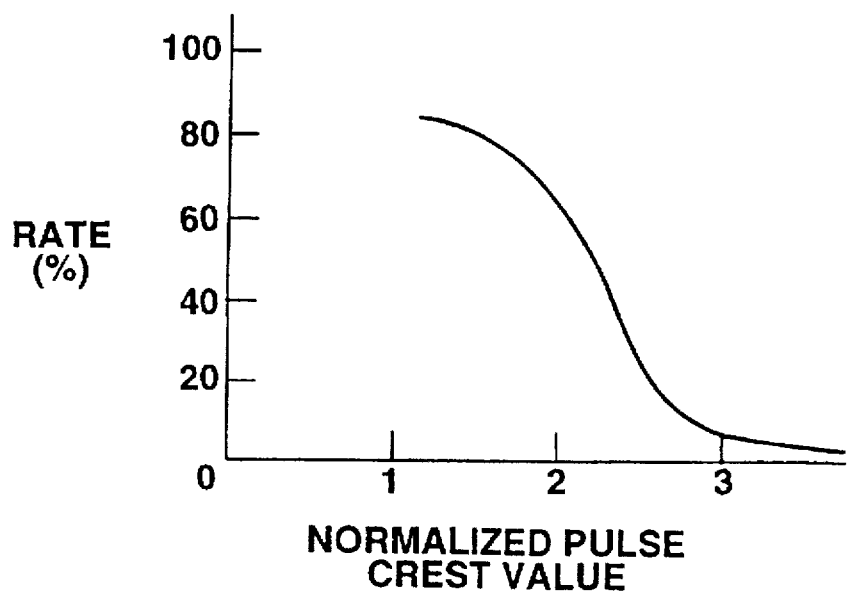
FIG. 4 is a curve showing the relation between the normalized pulse crest value and the ratio of the MR head with the MR elements being of the initial MR characteristics being 5% or higher.

Meanwhile, the MR element 1 shows hysteretic changes in its MR characteristics, as shown in FIG. 3. If, in reproducing information signals using the MR element 1, a larger external magnetic field, such as a stray magnetic field from the recording magnetic head, is impressed on the MR element 1, transition on the MR characteristic curve occurs from an operating curve, referred to as a curve S1 in FIG. 3, to the opposite operating curve, referred to herein as a curve S2 in FIG. 3. Since the curve B is steeper than the curve A in the vicinity of the operating point A, the MR element 1 exhibits an operation of higher sensitivity when operating on the curve B than when operating on the curve A. Since this change occurs irrevocably, the MR element 1 exhibits MR characteristics of the curve S2 since the time when such change has occurred.

Thus, if the pulses initial current is positively supplied to the MR element 1 prior to supplying the sense current, the MR element 1 shifts to the MR characteristics of the curve S2. If the bias current ic continued to be supplied to the bias conductor 14 since that time, the MR element 1 perpetually operates with a stabilized output and excellent sensitivity.

An experimental example is now explained. In this experiment, plural MR heads were designed as recording magnetic heads and as compound thin-film magnetic heads, and the optimum pulse crest and the pulse width of the initial current supplied to the MR heads were checked. Specifically, of the 50 MR heads, the rate of the magnetic heads exhibiting stable outputs on being supplied with the initial current, that is the magnetic heads for which the MR characteristics of the MR elements follow the curve S1, was checked. The rate means such a rate which is calculated by repeating recording and reproduction by the compound magnetic heads 100 times to find values of standard deviations which are multiplied by three and are then divided by a mean value and by representing the calculated values in percent, with the rate thus calculated being not less than 5%.

As a first experiment, the relation between the pulse crest value of the initial current divided by the sense current value (normalized pulse crest value) and the above rate was checked.

It is seen from this experiment that, if the pulse crest value is on the order of 1.1 times the sense current value, the MR characteristics of not less than 80% of the MR heads are in the state of the curve S1, whereas, if the pulse crest value is thrice the sense current value or higher, the MR characteristics of approximately 10% of the MR heads are in the state S1.

Thus it is seen that for shifting the MR characteristics of the MR element 1 from the curve S1 to the curve S2, the pulse crest value not less than thrice the sense current is required.

Next, as a second experiment, the pulse crest value was set at thrice the sense current value, and the relation between the pulse width value of the initial current and the above rate was checked.

Figure 5:
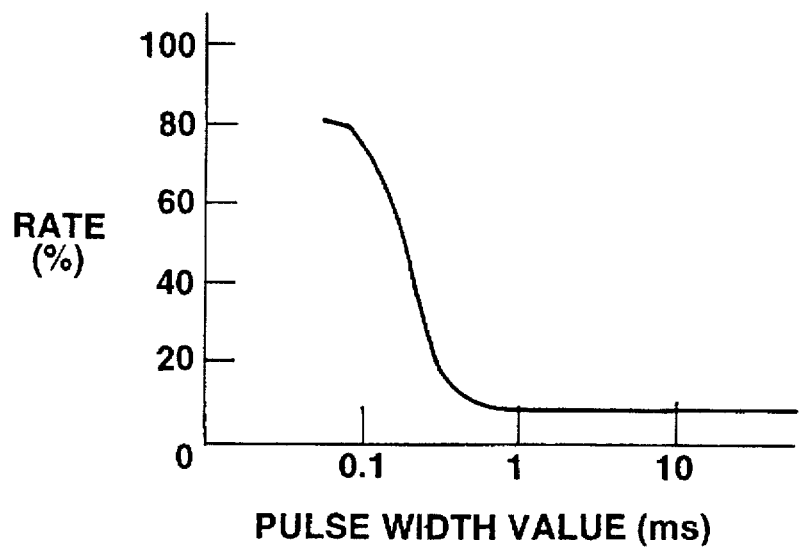
FIG. 5 is a curve showing the relation between the pulse width value and the ratio of the MR head with the MR elements being in the initial MR characteristics being 5% or higher.
Figure 6:
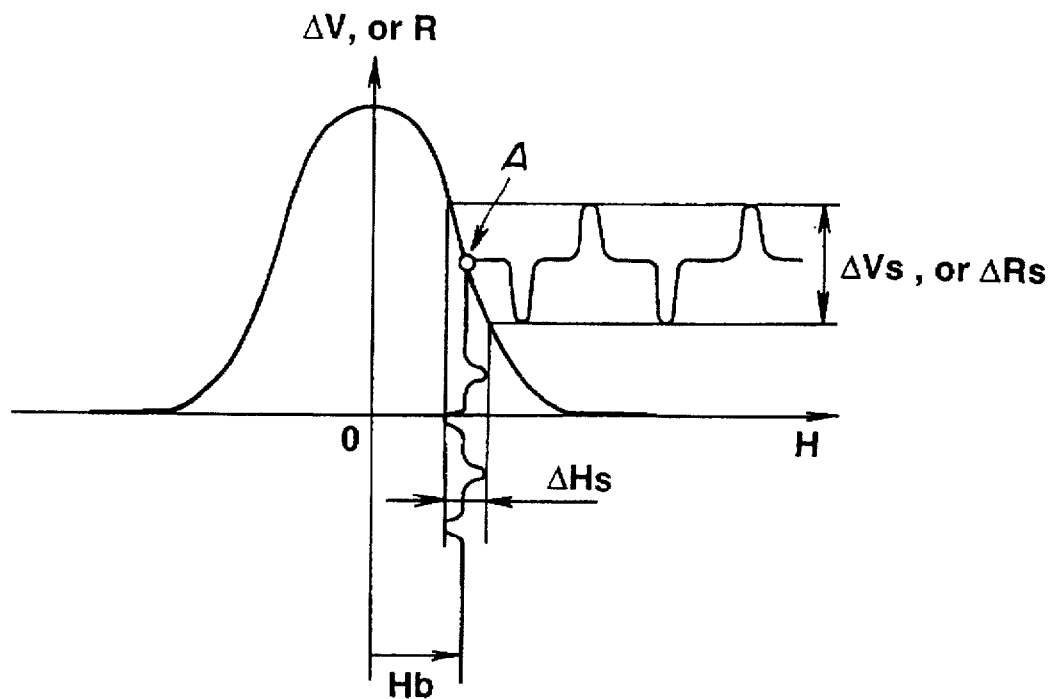
FIG. 6 is a curve showing MR characteristics f an MR head.
Figure 7:
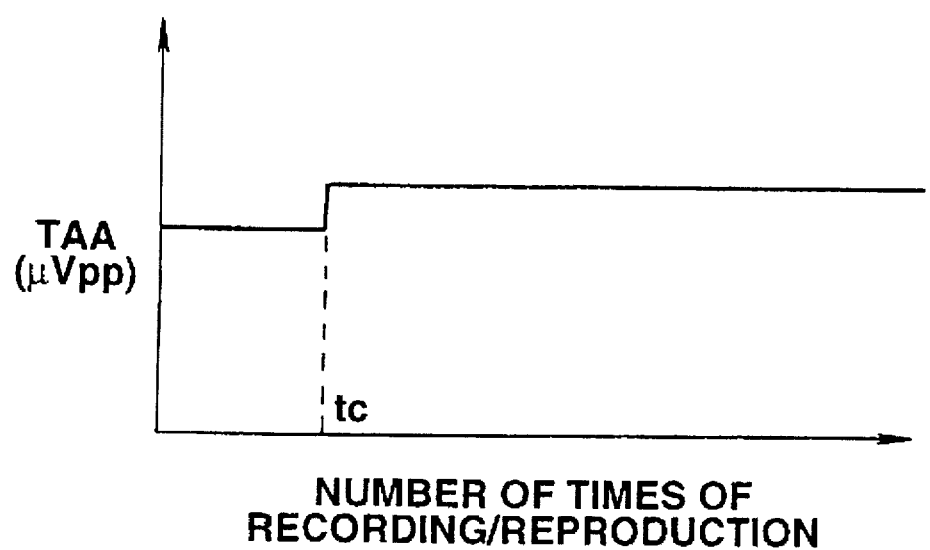
FIG. 7 is a curve showing the relation between TAA and the number of times of recording/reproduction on recording/reproducing a compound thin film magnetic head having an MR head.

It is seen from FIG. 5 that, as the pulse width value is decreased, the above rate was substantially constant up to the pulse width of approximately 1 ms and that, if the pulse width value exceeds the above value, the rate is increased abruptly.

Thus it is seen that, for shifting the MR characteristics of the MR element from the curve S1 to the curve S2, the pulse width value not less than 1 ms is required.

With the driving method for the ME element according to the present invention, the MR head can be operated with characteristics with stable output and with highly sensitive MR characteristics.

It is to be noted that the present invention is not limited to the above described merely illustrative embodiments. For example, the present invention may be applied not only to the MR head but also to any device having an MR element.

What is claimed is:

1. A method for driving a magneto-resistive effect element in which a bias magnetic field is applied by a bias conductor fed with a bias current to a magneto-resistive effect element whose resistivity is changed with an impressed magnetic field, wherein the improvement comprises:

supplying to said bias conductor a pulsed initial current having a pulse crest value that is higher than the bias current value prior to supplying said bias current; and thereafter supplying said bias current to said bias conductor.

2. The method as claimed in claim 1 wherein the pulse crest value of the initial current being not less than three times the bias current value and the pulse width value being not less than 1 msec.

3. The method as claimed in claim 1 wherein the magneto-resistive effect element is employed as a magneto-resistive effect type magnetic head.

4. The method as claimed in claim 3 wherein the magneto-resistive effect element is connected in series with the bias conductor.

* * * * *